(12) United States Patent
Schiltz et al.

(10) Patent No.: US 11,465,267 B2
(45) Date of Patent: Oct. 11, 2022

(54) TOOL HOUSING AND METHOD FOR MAKING THE SAME

(71) Applicant: Snap-on Incorporated, Kenosha, WI (US)

(72) Inventors: John D. Schiltz, Murfreesboro, TN (US); Nathan H. Purcell, Murphy, NC (US); Joshua M. Beer, Racine, WI (US)

(73) Assignee: Snap-on Incorporated, Kenosha, WI (US)

( * ) Notice: Subject to any disclaimer, the term of this patent is extended or adjusted under 35 U.S.C. 154(b) by 16 days.

(21) Appl. No.: 16/041,001

(22) Filed: Jul. 20, 2018

(65) Prior Publication Data

US 2020/0023507 A1    Jan. 23, 2020

(51) Int. Cl.
| | |
|---|---|
| *B25F 5/02* | (2006.01) |
| *B23G 1/32* | (2006.01) |
| *B25B 21/00* | (2006.01) |
| *B25B 23/00* | (2006.01) |

(52) U.S. Cl.
CPC ............. *B25F 5/02* (2013.01); *B23G 1/32* (2013.01); *B25B 21/004* (2013.01); *B25B 23/0042* (2013.01)

(58) Field of Classification Search
CPC .. B25F 5/02; B25F 5/022; B25F 5/023; B25B 21/004; B25B 23/0042
USPC .............................................. 81/177.1, 57.13
See application file for complete search history.

(56) References Cited

U.S. PATENT DOCUMENTS

| | | | | |
|---|---|---|---|---|
| 2,808,749 | A | * | 10/1957 | Lampke ................ B25B 21/002 81/57.13 |
| 4,346,630 | A | | 8/1982 | Hanson |
| 4,958,541 | A | | 9/1990 | Annis et al. |
| 5,450,773 | A | * | 9/1995 | Darrah .................. B25B 13/463 81/57.39 |
| 5,584,220 | A | * | 12/1996 | Darrah .................. B25B 13/463 81/57.29 |
| 5,709,136 | A | * | 1/1998 | Frenkel ................... B25B 17/00 81/57.13 |
| 6,079,301 | A | | 6/2000 | Scolo |
| 6,915,721 | B2 | | 7/2005 | Hsu et al. |
| 7,080,578 | B2 | | 7/2006 | Izumisawa |

(Continued)

FOREIGN PATENT DOCUMENTS

| | | |
|---|---|---|
| CN | 1689903 A | 11/2005 |
| CN | 1745973 A | 3/2006 |

(Continued)

OTHER PUBLICATIONS

UK Combined Search and Examination Report for Application No. GB1901207.9, dated Jul. 19, 2019, 9 pages.

(Continued)

*Primary Examiner* — Hadi Shakeri
(74) *Attorney, Agent, or Firm* — Seyfarth Shaw LLP

(57) ABSTRACT

A tool housing and method for making the same are disclosed. The tool housing can include upper and middle portions that are fully machined and coupled to one another. The tool housing can also include a lower housing that is partially machined, coupled to the remaining housing portions, and then fully machined. In doing so, the machining operation is eased and the portions of the housing are better aligned with one another.

6 Claims, 10 Drawing Sheets

(56) References Cited

U.S. PATENT DOCUMENTS

| | | | |
|---|---|---|---|
| 7,306,050 | B2 | 12/2007 | Chen |
| 7,418,785 | B2 * | 9/2008 | Whitemiller ...... B05C 17/00503 30/182 |
| 7,735,398 | B2 | 6/2010 | Hsu et al. |
| 7,779,731 | B1 | 8/2010 | Boccadutre et al. |
| 8,671,806 | B2 | 3/2014 | Lindblom |
| 2005/0051002 | A1 * | 3/2005 | Brun ...................... B25B 13/463 81/57.39 |
| 2006/0027048 | A1 | 2/2006 | Chen |
| 2007/0234854 | A1 | 10/2007 | Collins |
| 2008/0190246 | A1 | 8/2008 | Hsu et al. |
| 2008/0271574 | A1 | 11/2008 | Lin et al. |
| 2011/0067534 | A1 * | 3/2011 | Cheng .................. B25B 23/141 81/470 |
| 2011/0162493 | A1 | 7/2011 | Anjanappa et al. |
| 2012/0186400 | A1 | 7/2012 | Elger |
| 2012/0255404 | A1 | 10/2012 | Chang et al. |
| 2013/0098213 | A1 | 4/2013 | Lindblom |
| 2014/0053688 | A1 | 2/2014 | Yaschur |
| 2014/0102742 | A1 | 4/2014 | Eshleman et al. |
| 2014/0157961 | A1 | 6/2014 | Chen |
| 2014/0165797 | A1 | 6/2014 | Hsieh |
| 2014/0262394 | A1 * | 9/2014 | Scott .................. B25B 23/0007 173/48 |

FOREIGN PATENT DOCUMENTS

| | | |
|---|---|---|
| CN | 1880030 A | 12/2006 |
| CN | 204397780 U | 6/2015 |
| EP | 2933061 A2 | 10/2015 |
| GB | 2415652 | 1/2006 |
| JP | 2007105869 A | 4/2007 |
| TW | 200615096 A | 5/2006 |
| TW | I346601 | 8/2011 |
| TW | I573673 | 3/2017 |
| TW | M556196 U | 3/2018 |
| TW | 202014273 A | 4/2020 |
| WO | 2018052923 A1 | 3/2018 |

OTHER PUBLICATIONS

Taiwan Office Action for Application No. 10920061280 dated Jan. 20, 2020, 6 pages.
Examination Report No. 1 for Australian Application No. 2019200469 dated Feb. 7, 2020, 8 pages.
Examiner's Report for Canadian Application No. 3,033,002 dated Feb. 20, 2020, 4 pages.
Australian Examination Report No. 2 for Application No. 2019200469 dated Jun. 26, 2020, 4 pages.
UK Combined Search and Examination Report for Application No. GB2009891.9 dated Feb. 10, 2021, 6 pages.
Taiwan Office Action for Application No. 109115370 dated Nov. 19, 2020, 6 pages.
Examination Report No. 1 for Australian Application No. 2020203644 dated May 28, 2021, 11 pages.
Taiwan Office Action for corresponding Application No. 11020263860 dated Mar. 24, 2021, 3 pages.
Taiwan Office Action for corresponding Application No. 11020544270 dated Jun. 10, 2021, 9 pages.
United Kingdom Office Action for corresponding Application No. GB1901207.9 dated Jun. 21, 2021, 4 pages.
United Kingdom Office Action for corresponding Application No. GB2009891.9 dated Jul. 23, 2021, 3 pages.
Canadian Office Action for corresponding Application No. 3,089,398 dated Sep. 17, 2021, 4 pages.
United Kingdom Combined Search and Examination Report for corresponding Application No. GB2107962.9 dated Sep. 9, 2021, 5 pages.
Chinese Office Action for corresponding Application No. 201910657415.9 dated Apr. 26, 2022, 8 pages.
Search and Examination Report for corresponding Application No. GB2009891.9 dated Apr. 28, 2022, 5 pages.
Examination Report for corresponding Application No. GB2009891.9 dated Aug. 8, 2022, 5 pages.

* cited by examiner

TOOL HOUSING AND METHOD FOR MAKING THE SAME

TECHNICAL FIELD OF THE INVENTION

The invention relates generally to housings for tools. More particularly, the present invention relates to a multi-piece tool housing and method for making the same.

BACKGROUND OF THE INVENTION

Tools wrenches are commonly used in professional or do-it-yourself applications. Some tools, such as, for example, power ratchet wrenches, include a housing that houses the motor and mechanical components that drive the ratchet head and cause it to apply torque to a work piece. These housings are often of the clamshell type and can also be elongated and connect to a removable battery.

It can be difficult to machine the tool housing because of the need to access the inside of the housing. For example, the undercut of the housing near the crank shaft is typically difficult to machine. As the tool housing becomes longer, it becomes more difficult to machine the undercut with a boring bar or other conventional tool. More specialty items are then necessary to complete the machining operation.

SUMMARY OF THE INVENTION

The present invention broadly comprises a tool housing, such as, for example, a ratchet housing, and method for making the same. The housing can include three separate portions that couple to one another and that are machined in a sequence that allows the portions to be aligned with respect to one another, but where the insides of the portions are accessible to machining tools. For example, the upper and middle housings can be fully machined and coupled to one another by threads, and the lower housing can be partially machined, for example, to include threads. The lower housing can then be coupled to the remaining portions of the housing and fully machined thereafter. In doing so, the machining operation is eased and the portions of the housing are aligned with one another.

For example, the present invention broadly comprises a method for making a tool housing including providing an upper housing, a middle housing, and a lower housing, machining the upper and middle housings, assembling the upper housing to the middle housing, partially machining the lower housing, assembling the lower housing to the upper and middle housings, and then completing the machining of the lower housing.

The present invention also broadly comprises a tool housing, such as a ratchet housing, including an upper housing adapted to receive a ratchet head, a middle housing coupled to the upper housing by a threaded connection, and a lower housing coupled to the middle housing and adapted to removably receive a power source. The upper housing includes a rim adapted to receive a middle collar of the middle housing to align the middle housing with the upper housing.

The present invention further broadly comprises a tool housing, such as a ratchet housing, including an upper housing adapted to receive a ratchet head, a middle housing coupled to the upper housing by a threaded connection, and a lower housing coupled to the middle housing and adapted to removably receive a power source. The lower housing includes a lower extension and the middle housing includes a middle opening adapted to receive the lower extension to align the lower housing with the middle housing.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
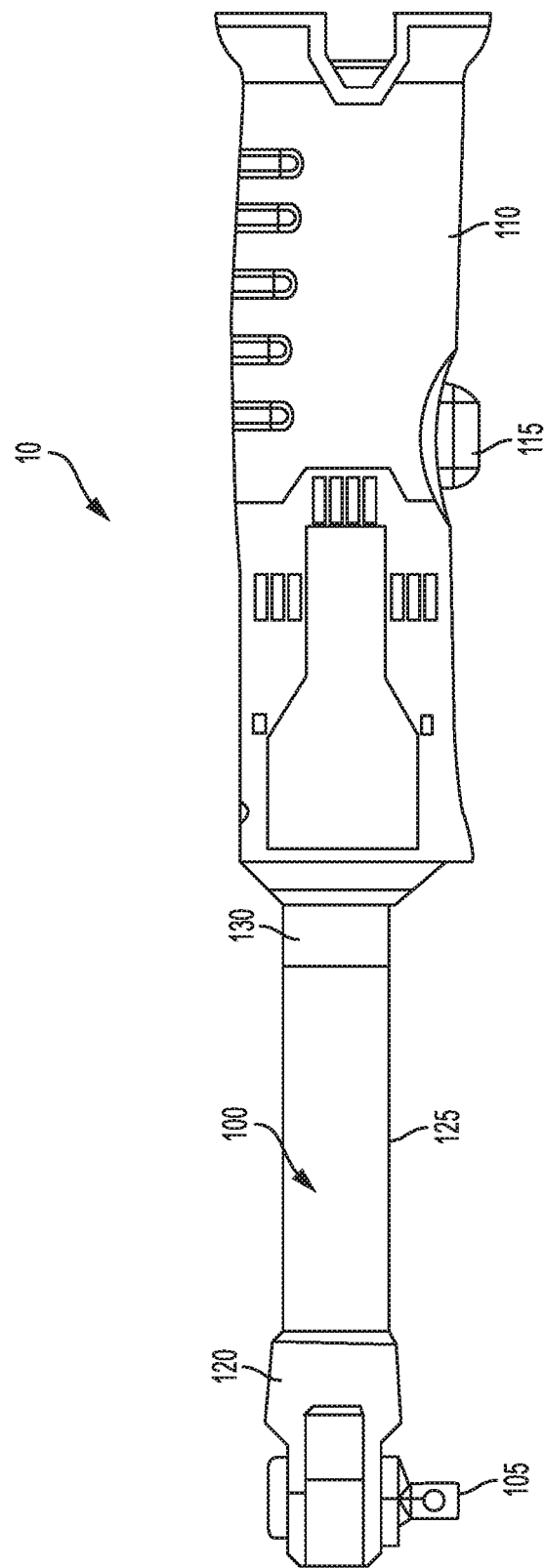
FIG. 1 is a side view of a tool housing, shown as a ratchet wrench, according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a tool housing, such as, for example, a ratchet housing, and method for making the tool housing. The housing can include upper and middle housings that are fully machined and coupled to one another, and a lower housing that is partially machined, coupled to the remaining housing portions, and then fully machined. In doing so, the machining operation is eased and the portions of the housing are better aligned with one another due to the structures that are included during the machining process.

As shown, FIG. 1 illustrates a side view of a tool, 10, such as a ratchet wrench. The tool 10 can include a housing 100 coupled to a ratchet head 105 that imparts torque to a work piece. For example, a power supply 110 can selectively provide power to the ratchet head 105 when a user engages a trigger 115. The power supply 110 can be any known power supply but in a preferred embodiment is a battery.

The tool housing 100 includes three separate portions: an upper housing 120, a middle housing 125, and a lower housing 130. These housings 120, 125, 130 are separate portions of the ratchet housing 100 that allow the tool housing 100 to be machined more easily than a conventional single integral tool housing. For example, the tool housing 100 can be machined by allowing tools to reach areas that would otherwise require specialty machining tools. As discussed below in more detail, the process by which the housings 120, 125, 130 are machined also allows the upper 120 and middle 125 housings to be aligned with one another prior to the lower housing 130 being machined.

Figure 2:
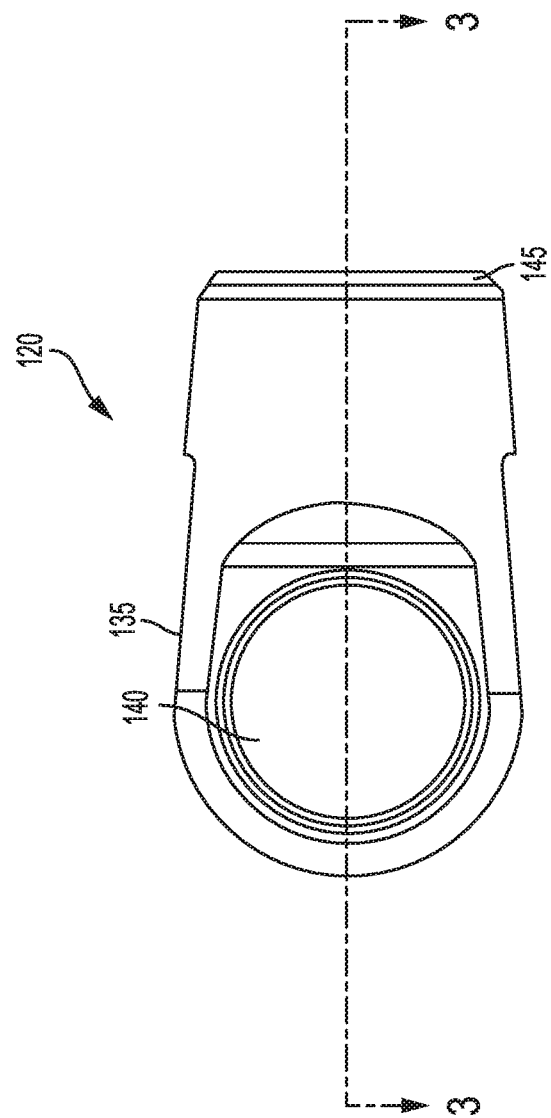
FIG. 2 is a front view of an upper housing, according to at least some of the presently disclosed embodiments.
Figure 3:
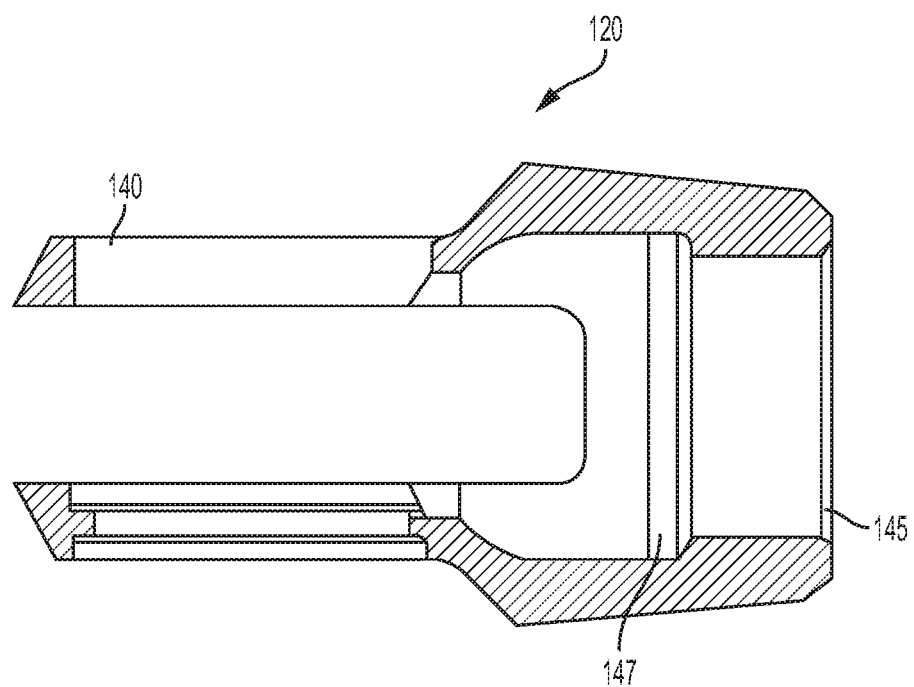
FIG. 3 is a side sectional view of the upper housing as cut along the line 3 shown in FIG. 2, according to at least some of the presently disclosed embodiments.
Figure 9:
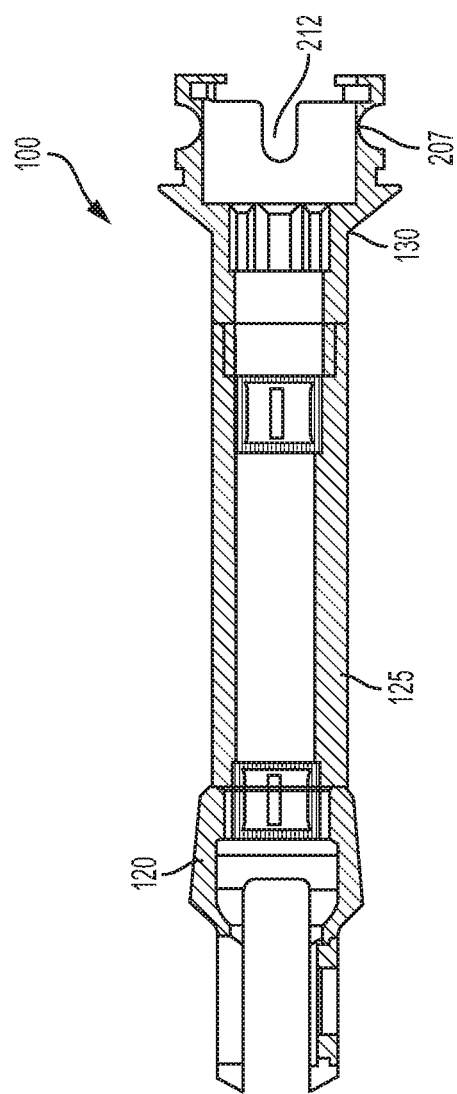
FIG. 9 is a side sectional view of the assembled ratchet housing as cut along the line 8 shown in FIG. 8, according to at least some of the presently disclosed embodiments.

FIG. 2 illustrates a front view of the upper housing 120, and FIG. 3 illustrates a side sectional view of the upper housing 120, as cut along the line 3 shown in FIG. 2. As shown, the upper housing 120 includes an upper body 135 defining an opening 140 for the ratchet head 105, and upper threads 145 for coupling to the middle portion 125. As shown in FIG. 3, the upper housing 120 can also include a rim 147 that surrounds the interior of the upper portion 120 and that prevents the upper portion 120 from passing axially through the passage where the upper threads 145 are located, as best shown in FIG. 9. The rim 147 can also better align the housings 120, 125 when connected to one another, and is more easily machined because the tool housing 100 is three separate portions assembled together rather than the prior art tool housings, which are one integral piece.

Figure 4:
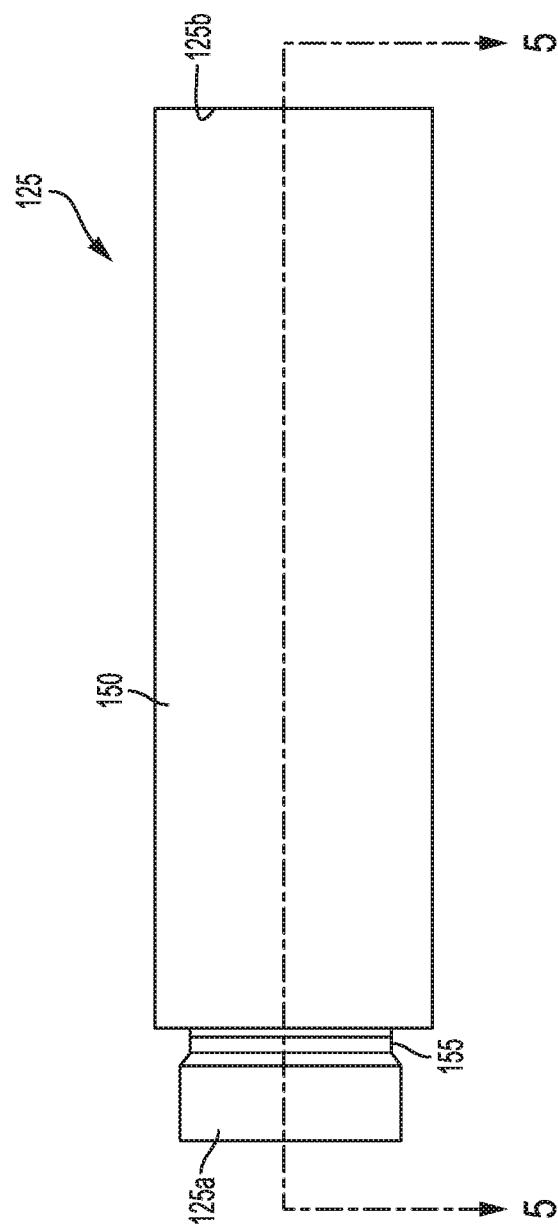
FIG. 4 is a front view of a middle housing, according to at least some of the presently disclosed embodiments.
Figure 5:
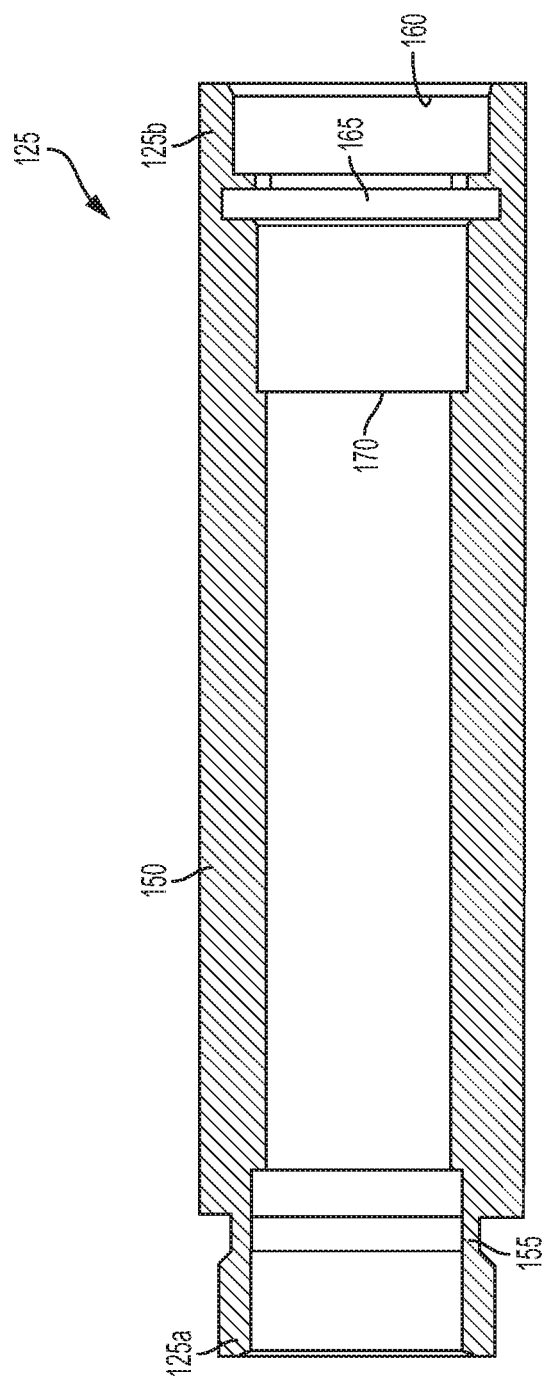
FIG. 5 is a side sectional view of the middle housing, as cut along the line 5 shown in FIG. 4, according to at least some of the presently disclosed embodiments.

FIG. 4 illustrates a front view of the middle housing 125 and FIG. 5 illustrates a side sectional view of the middle housing 125 as cut along the line 5 shown in FIG. 4. As shown, the middle housing 125 can have first 125a and second 125b ends opposite one another and a middle body 150 extending therebetween. A middle collar 155 can be provided near the first end 125a that interfaces with the rim 147 of the upper portion 120. For example, the middle collar 155 can fit within the rim 147 to provide a connection that couples the upper portion 120 to the middle portion 125, and the upper 120 and middle 125 portions can further be coupled together by threads. Near the second end 125b the middle housing 125 can include threads 160 that couple to the lower housing 130, and a middle indent 165 and middle opening 170 that receive portions of the lower housing 130, as discussed below in more detail. These internal features, such as the middle collar 155 and rim 147 interacting with one another, and the middle indent 165 and middle opening 170 interacting with lower housing 130 features, allow the tool housing 100 to better align itself when fully assembled.

Figure 6:
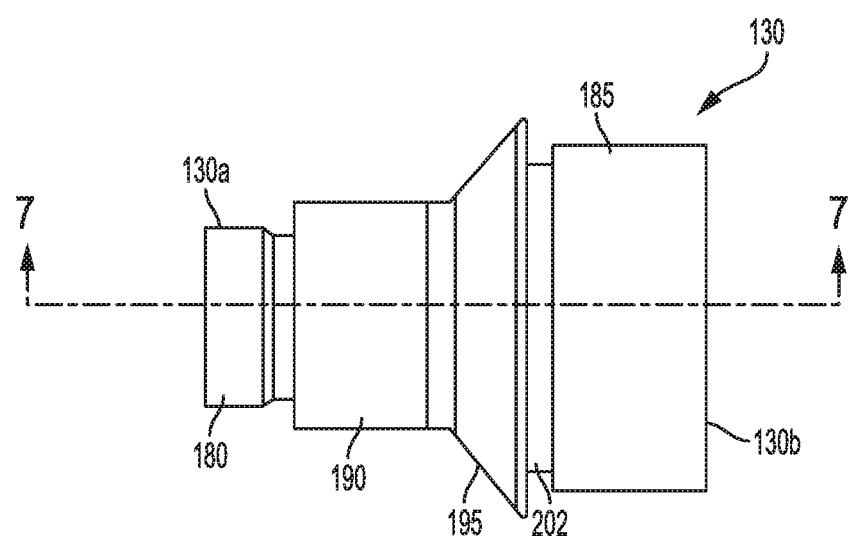
FIG. 6 is a front view of a lower housing, according to at least some of the presently disclosed embodiments.
Figure 7:
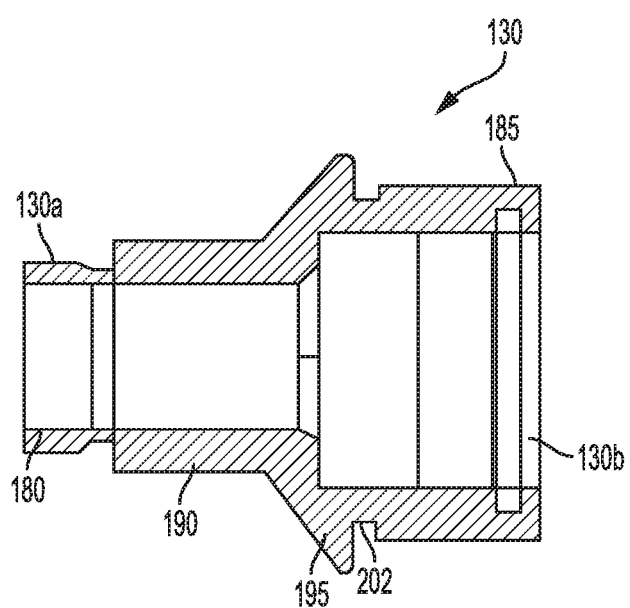
FIG. 7 is a side sectional view of the lower housing as cut along the line 6 shown in FIG. 6, according to at least some of the presently disclosed embodiments.

FIG. 6 illustrates a front view of the lower housing 130 and FIG. 7 illustrates a side sectional view of the lower housing as cut along the line 7 shown in FIG. 6. FIGS. 6 and 7 illustrate the lower housing 130 after having undergone partial machining, and prior to being coupled to the remainder of the tool housing 100. For example, the lower housing 130 can have a first side 130a and a second side 130b. A lower extension 180 can be located near the first side 130a and a lower body 185 can be located near the second side 130b. The lower extension 180 can fit within the middle opening 170, as shown in FIG. 9, and the lower base 190 can fit within the middle indent 165, also as shown in FIG. 9. The middle 125 and lower 130 housings can also couple to one another via threads, e.g., at the interface between the lower extension 180 and middle opening 170, or the interface between the lower base 190 and the middle indent 165, for example. A lower flange 195 can provide a structural and aesthetic interface between the lower base 190 and the lower body 185. For example, a removable battery can couple to the lower body 185, including at a lower collar 202.

Figure 8:
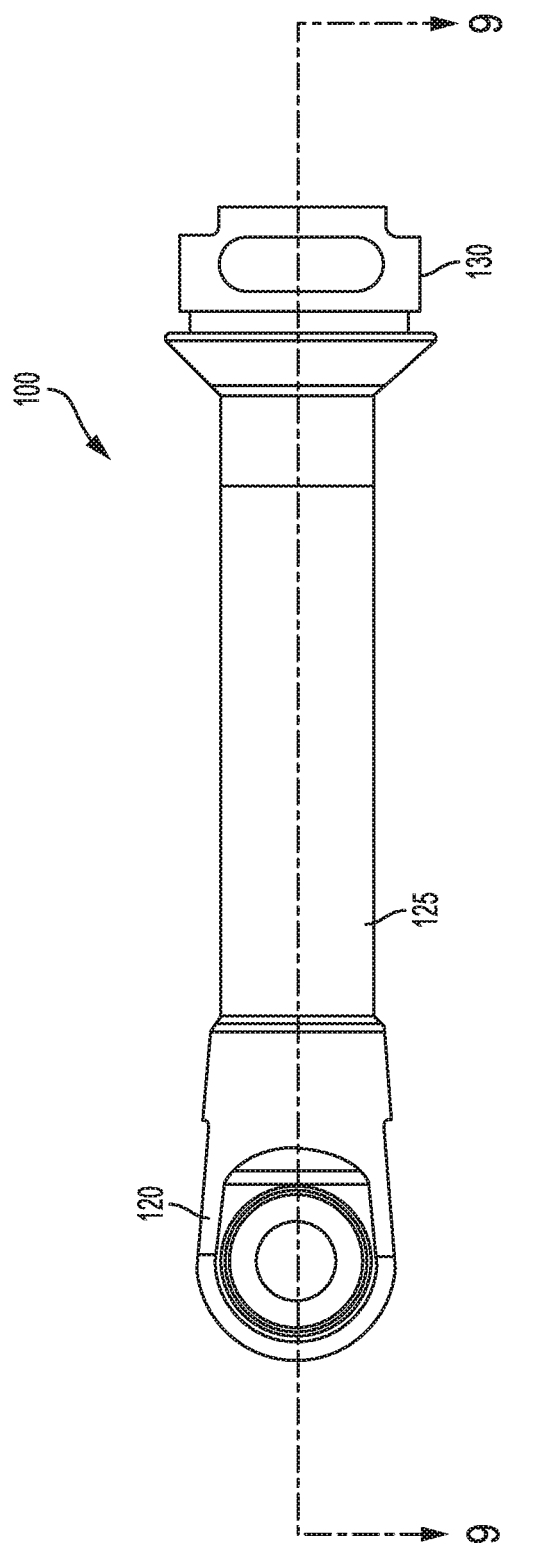
FIG. 8 is a front view of an assembled ratchet housing according to at least some of the presently disclosed embodiments.

FIG. 8 illustrates a front view of a ratchet housing 100 as assembled and with the lower housing 130 more fully machined, and FIG. 9 illustrates a front view of the ratchet housing 100 as cut along the line 9 shown in FIG. 8. As shown, the upper housing 120 and middle housing 125 can be fully machined and coupled to one another at threads located near the first end 125a of the middle portion 125. The lower housing 130 can be partially machined and coupled to the middle portion 125, for example, with threads located near the second end 125b of the middle housing 125. Thereafter, the lower housing 130 can be more fully machined, for example, by machining a cut out 207 and slot 212, as shown in FIGS. 8 and 9.

In some embodiments, the middle housing 125 and the lower housing 130 are combined as one integral lower housing piece. In this manner, the upper housing 120 can be fully machined first, and the combined middle and lower housing (for purposes of this embodiment, referred to as the lower housing 130) can then be partially machined, for example, by machining threads and then coupled to the upper housing 120 in a threaded configuration. Thereafter, the lower housing 130 can be machined with a cut out 207 and a slot 212, similar to the embodiment of FIGS. 8 and 9.

Figure 10:
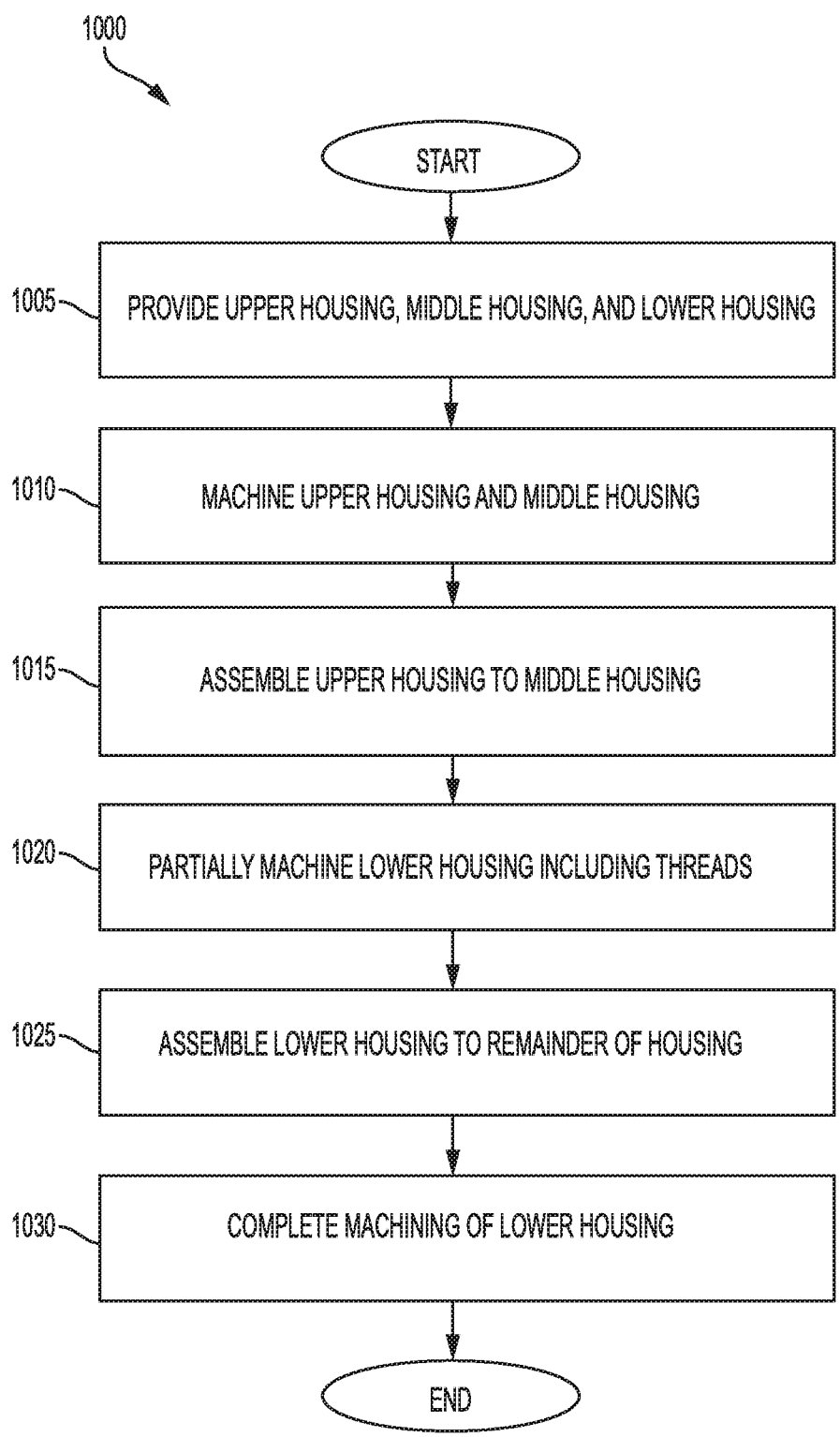
FIG. 10 is a flowchart illustrating at least one method according to at least some of the presently disclosed embodiments.

FIG. 10 illustrates a flow chart according to at least some of the presently disclosed embodiments. As shown, the process 1000 begins and proceeds to step 1005, where the upper housing 120, middle housing 125, and lower housing 130 are provided. The upper housing 120 and middle housing 125 can then be machined in step 1010. Thereafter, the upper housing 120 can be assembled to the middle housing 125 in step 1015. The lower housing 130 can be partially machined either after step 1015 or in advance of step 1015, as shown in step 1020. The lower housing 130 can then be coupled to the remainder of the ratchet housing 100 in step 1025, and the lower housing 130 can be more completely machined in step 1030. After step 1030, the process 1000 ends.

In this manner, the machining operation is eased and the portions of the ratchet housing 100 are better aligned with one another. For example, the upper 120 and middle 125 housings can be aligned with the threads and the various internal components that interact to couple the housings 120, 125 together. By separating the housings 120, 125, 130 into three components, the tool housing 100 is easier to machine without requiring specialty tools to reach into the tool housing 100 to perform the necessary operations.

The present invention is discussed above as including three portions of the ratchet housing 100, that is, the upper housing 120, middle housing 125, and lower housing 130. However, the present invention is not so limited. Optionally, the middle housing 125 can be omitted and the upper housing 120 can be directly coupled to the lower housing 130. The ratchet housing 100 can also include multiple middle housings 125. Moreover, the present invention is described as being used with a ratchet wrench housing. However, it will be understood by those skilled in the art that the present invention could be used with any tool requiring a housing, without departing from the scope and spirit of the present invention.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool housing comprising:
   an upper housing portion having a transversely oriented tool head opening adapted to receive a tool head and a first threaded opening;
   a middle housing portion having first and second ends, the first end includes threads disposed on an external surface thereof and a collar, wherein the first end is threadably coupled to the first threaded opening, and wherein the second end includes a second threaded opening having threads disposed on an internal surface of the second threaded opening; and
   a lower housing portion having first and second lower housing portion ends, the first lower housing portion end including an extension having threads disposed on an external surface thereof and is threadably coupled to the second threaded opening, and the second lower housing portion end including a body portion having a slot and that is adapted to be removably coupled to a main body of a tool, wherein the main body of the tool houses a motor, wherein the upper housing portion includes a rim adapted to receive the collar to align the middle housing portion with the upper housing portion.

2. The tool housing according to claim 1, wherein the lower housing portion includes a base disposed between the extension and the body portion, and the middle housing portion includes an indent.

3. The tool housing according to claim 1, wherein the body portion further includes a cut out.

4. The tool housing according to claim 1, wherein the body portion further includes a collar.

5. The tool housing according to claim 1, wherein the lower housing portion further includes a base portion disposed between the extension and the body portion, and a flange disposed between the base portion and the body portion, wherein the flange provides a structural interface between the base portion and the body portion.

6. The tool housing according to claim 1, wherein the tool head is a ratchet head.

* * * * *